US009062620B2

(12) United States Patent
Ando et al.

(10) Patent No.: US 9,062,620 B2
(45) Date of Patent: Jun. 23, 2015

(54) VEHICLE AND CONTROL METHOD FOR VEHICLE

(75) Inventors: Daigo Ando, Nagoya (JP); Takuji Matsubara, Nagoya (JP); Takahiro Nishigaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 13/995,291

(22) PCT Filed: Jan. 12, 2011

(86) PCT No.: PCT/JP2011/050309
§ 371 (c)(1),
(2), (4) Date: Jun. 18, 2013

(87) PCT Pub. No.: WO2012/095952
PCT Pub. Date: Jul. 19, 2012

(65) Prior Publication Data
US 2013/0297180 A1  Nov. 7, 2013

(51) Int. Cl.
*F02D 41/00* (2006.01)
*B60K 6/445* (2007.10)
*B60W 30/20* (2006.01)
*B60W 20/00* (2006.01)
*B60W 10/06* (2006.01)

(52) U.S. Cl.
CPC ............ *F02D 41/00* (2013.01); *Y02T 10/6239* (2013.01); *B60K 6/445* (2013.01); *B60W 30/20* (2013.01); *B60W 2030/206* (2013.01); *B60W 20/50* (2013.01); *B60W 20/1084* (2013.01); *B60W 2510/0619* (2013.01); *B60W 2510/0638* (2013.01); *B60W 2510/0642* (2013.01)

(58) Field of Classification Search
CPC ....... F02D 41/00; B60W 10/06; B60W 10/08; B60W 10/30; B60W 30/18018; F02N 11/0814; F02N 11/822; F02N 2011/0896
See application file for complete search history.

(56) References Cited

U.S. PATENT DOCUMENTS 6,020,697 A * 2/2000 Shimasaki et al. ............ 318/140
7,633,257 B2 * 12/2009 Sakamoto et al. ............ 318/611
8,870,710 B2 * 10/2014 Watanabe et al. ................ 477/4
2009/0151469 A1  6/2009 Suzuki
(Continued)

FOREIGN PATENT DOCUMENTS

JP    A-2-277947    11/1990
JP    A-2001-317402    11/2001
(Continued)

*Primary Examiner* — Hieu T Vo
(74) *Attorney, Agent, or Firm* — Oliff PLC

(57) ABSTRACT

A vehicle includes an engine, a first MG (motor generator), a second MG, a motive power split device, and an ECU. ECU temporarily determines whether or not an imbalance abnormality has occurred based on an air-fuel ratio, and when it is temporarily determined that the imbalance abnormality is present, controls the engine such that the engine is in an idle state and formally determines whether or not the imbalance abnormality has occurred based on fluctuations in engine rotation speed. During a stop at idle, ECU determines whether or not the formal determination process of the imbalance determination is ongoing and carries out pressing control to cause the first MG to generate pressing torque Tp when the formal determination process is not ongoing and does not carry out the pressing control so as not to cause the first MG to generate pressing torque Tp when the formal determination process is ongoing.

6 Claims, 11 Drawing Sheets

(56) References Cited

U.S. PATENT DOCUMENTS

2010/0114460 A1 5/2010 Akimoto
2013/0297180 A1 11/2013 Ando et al.

FOREIGN PATENT DOCUMENTS

| | | |
|---|---|---|
| JP | A-2002-180863 | 6/2002 |
| JP | A-2004-084607 | 3/2004 |
| JP | A-2008-030673 | 2/2008 |
| JP | A-2008-057490 | 3/2008 |
| JP | A-2009-024531 | 2/2009 |
| JP | A-2009-144561 | 7/2009 |
| JP | A-2009-292362 | 12/2009 |
| WO | WO 2012/095952 A1 | 7/2012 |

* cited by examiner

US 9,062,620 B2

VEHICLE AND CONTROL METHOD FOR VEHICLE

TECHNICAL FIELD

The present invention relates to a vehicle and a control method for a vehicle.

BACKGROUND ART

Japanese Patent Laying-Open No. 2009-292362 (PTL 1) discloses a technology by which, in a vehicle including an engine and a motor coupled to an output shaft of the engine via a planetary gear mechanism, upon determination of whether or not a misfire at each cylinder of the engine is present based on rotational fluctuations of the engine, a threshold value used for the misfire determination is changed depending on whether or not torque for the prevention of an abnormal sound generated at the planetary gear mechanism is being output from the motor.

CITATION LIST

Patent Literature

PTL 1: Japanese Patent Laying-Open No. 2009-292362
PTL 2: Japanese Patent Laying-Open No. 2009-24531
PTL 3: Japanese Patent Laying-Open No. 2002-180863

SUMMARY OF INVENTION

Technical Problem

There may, however, arise a case where a sufficient accuracy of misfire determination cannot be ensured by, as in PTL 1, merely changing a threshold value used for the misfire determination depending on whether or not torque for the prevention of an abnormal noise generated at a planetary gear mechanism is being output. Accordingly, further improvements in determination accuracy are desired.

The present invention has been invented to solve the problem as described above, and an object of the present invention is, in a vehicle including an internal combustion engine and a motor coupled to the internal combustion engine via a gear mechanism, to achieve the suppression of an abnormal sound generated at the gear mechanism and an improved determination accuracy of a determination process based on rotational fluctuations of the internal combustion engine, with a good balance therebetween.

Solution to Problem

A vehicle according to the present invention includes: an internal combustion engine; a motor coupled to the internal combustion engine via a gear mechanism; and a control device carrying out a determination process determining whether or not the internal combustion engine has an abnormality based on rotational fluctuations of the internal combustion engine and a particular control causing the motor to generate suppressing torque for suppressing vibrations of the gear mechanism while the internal combustion engine is operating. The control device carries out the determination process and the particular control in a manner to avoid at least one of simultaneously carrying out the determination process and the particular control and notifying a user of a result of the determination process carried out during the particular control.

Preferably, the control device does not carry out the particular control when the determination process is ongoing.

Preferably, the internal combustion engine has a plurality of cylinders. The determination process is a process determining whether or not an imbalance abnormality where an imbalance arises between respective combustion states of the plurality of cylinders is present based on the rotational fluctuations. The particular control is control causing the motor to generate the suppressing torque acting in a direction hindering the internal combustion engine from operating.

Preferably, the control device includes: a determination unit carrying out the determination process; and a control unit carrying out the particular control. The determination unit temporarily determines whether or not the imbalance abnormality is present based on an air-fuel ratio in exhaust of the internal combustion engine and, when it is temporarily determined that the imbalance abnormality is present, controls the internal combustion engine such that the internal combustion engine is in an idle state and carries out the determination process based on the rotational fluctuations at the time of the internal combustion engine being in an idle state. When the internal combustion engine is in an idle state, the control unit carries out the particular control when the determination process is not ongoing and does not carry out the particular control when the determination process is ongoing.

Preferably, the control device does not notify a user of a result of the determination process when the determination process and the particular control are both ongoing.

Preferably, the internal combustion engine has a plurality of cylinders. The determination process is a process determining whether or not an imbalance abnormality where an imbalance occurs between respective combustion states of the plurality of cylinders is present based on the rotational fluctuations. The particular control is control causing the motor to generate the suppressing torque acting in a direction hindering the internal combustion engine from operating.

Preferably, the control device includes; a determination unit carrying out the determination process; and a control unit carrying out the particular control. The control unit carries out the particular control when the internal combustion engine is in an idle state. The determination unit temporarily determines whether or not the imbalance abnormality is present based on an air-fuel ratio in exhaust of the internal combustion engine and, when it is temporarily determined that the imbalance abnormality is present, controls the internal combustion engine such that the internal combustion engine is in an idle state and carries out the determination process based on the rotational fluctuations at the time of the internal combustion engine being in an idle state. The determination unit notifies a user of a result of the determination process when the particular control was not being carried out while the determination process was being carried out, and does not notify a user of a result of the determination process when the particular control was being carried out while the determination process was being carried out.

Preferably, the control device does not carry out the determination process when the particular control is ongoing.

Preferably, the internal combustion engine has a plurality of cylinders. The determination process is a process determining whether or not an imbalance abnormality where an imbalance occurs between respective combustion states of the plurality of cylinders is present based on the rotational fluctuations. The particular control is control causing the motor to generate the suppressing torque acting in a direction hindering the internal combustion engine from operating.

Preferably, the control device includes: a determination unit carrying out the determination process; and a control unit carrying out the particular control. The control unit carries out the particular control when the internal combustion engine is in an idle state. The determination unit temporarily determines whether or not the imbalance abnormality is present based on an air-fuel ratio in exhaust of the internal combustion engine and, when it is temporarily determined that the imbalance abnormality is present, controls the internal combustion engine such that the internal combustion engine is in an idle state and carries out the determination process based on the rotational fluctuations at the time of the internal combustion engine being in an idle state when the particular control is not ongoing and does not carry out the determination process when the particular control is ongoing.

A vehicle control method according to another aspect of the present invention is a control method performed by a control device of a vehicle including an internal combustion engine and a motor coupled to the internal combustion engine via a gear mechanism. The control method including the steps of: carrying out a determination process determining whether or not the internal combustion engine has an abnormality based on rotational fluctuations of the internal combustion engine; and carrying out particular control causing the motor to generate suppressing torque for suppressing vibrations of the gear mechanism while the internal combustion engine is operating. At least any one of the steps of carrying out the determination process and carrying out the particular control includes the step of avoiding at least one of simultaneously carrying out the determination process and the particular control and notifying a user of a result of the determination process carried out during the particular control.

Advantageous Effects of Invention

According to the present invention, in a vehicle including an internal combustion engine and a motor coupled to the internal combustion engine via a gear mechanism, the suppression of an abnormal sound generated at the gear mechanism and an improved determination accuracy of a determination process based on rotational fluctuations of the internal combustion engine can be achieved with a good balance therebetween.

DESCRIPTION OF EMBODIMENTS

Figure 1:
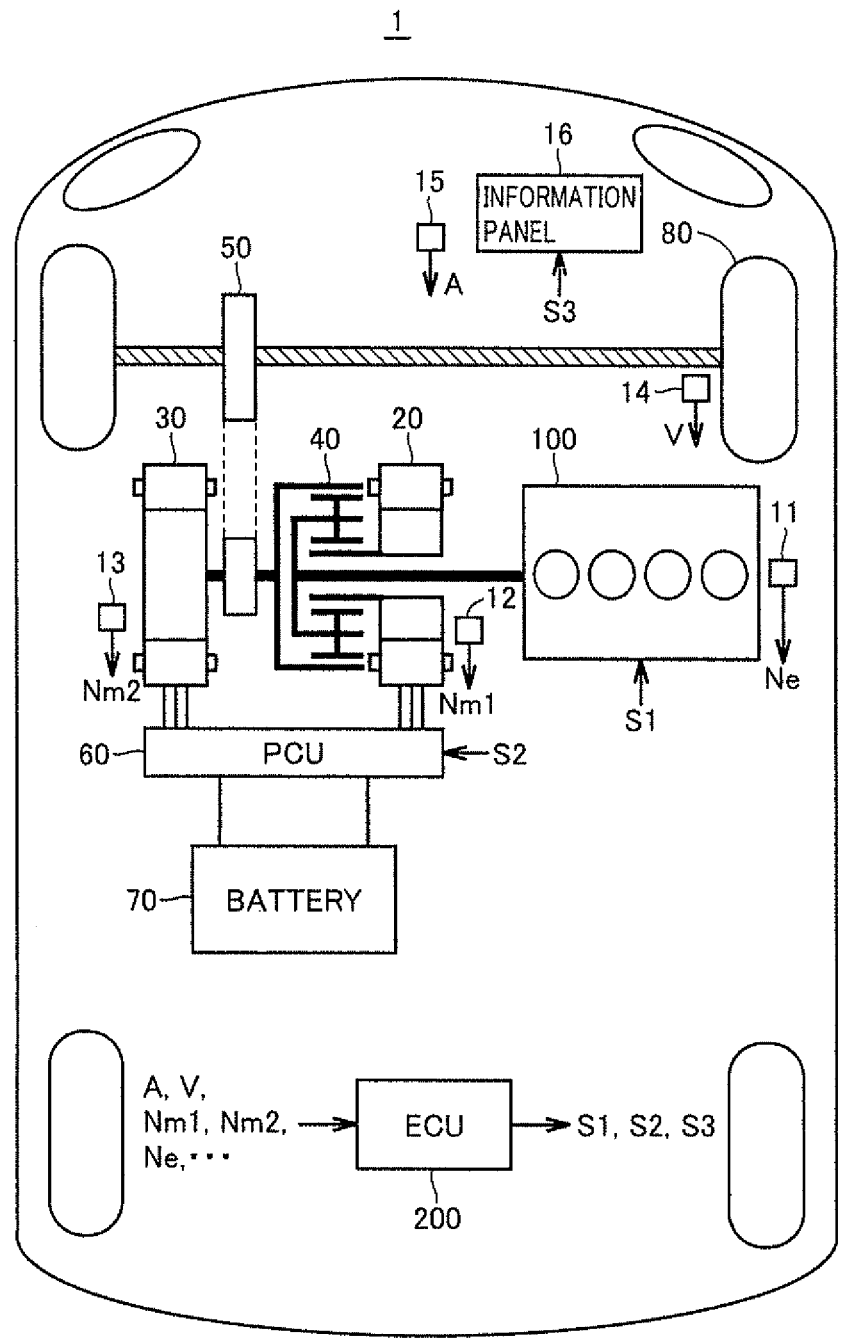
FIG. 1 is an overall block diagram of a vehicle.

Embodiments of the present invention will be hereinafter described in detail with reference to the drawings. In the drawings, the same or corresponding portions have the same reference signs allotted, and a description thereof will not be repeated.

First Embodiment

FIG. 1 is an overall block diagram of a vehicle 1 according to an embodiment of the present invention. Referring to FIG. 1, vehicle 1 includes an engine 100, a first MG (Motor Generator) 20, a second MG 30, a motive power split device 40, a speed reducer 50, a PCU (Power Control Unit) 60, a battery 70, drive wheels 80, and an ECU (Electronic Control Unit) 200.

Engine 100, first MG 20, and second MG 30 are coupled together via motive power split device 40. Vehicle 1 travels by driving force output from at least one of engine 100 and second MG 30. The driving force generated by engine 100 is split by motive power split device 40 into two paths, namely, one path transmitting the driving force to drive wheels 80 via speed reducer 50 and the other path transmitting the driving force to first MG 20.

Engine 100 is a multicylinder engine controlled by a control signal S1 (more specifically, S1$a$, S1$b$, and S1$c$) from ECU 200.

Figure 2:
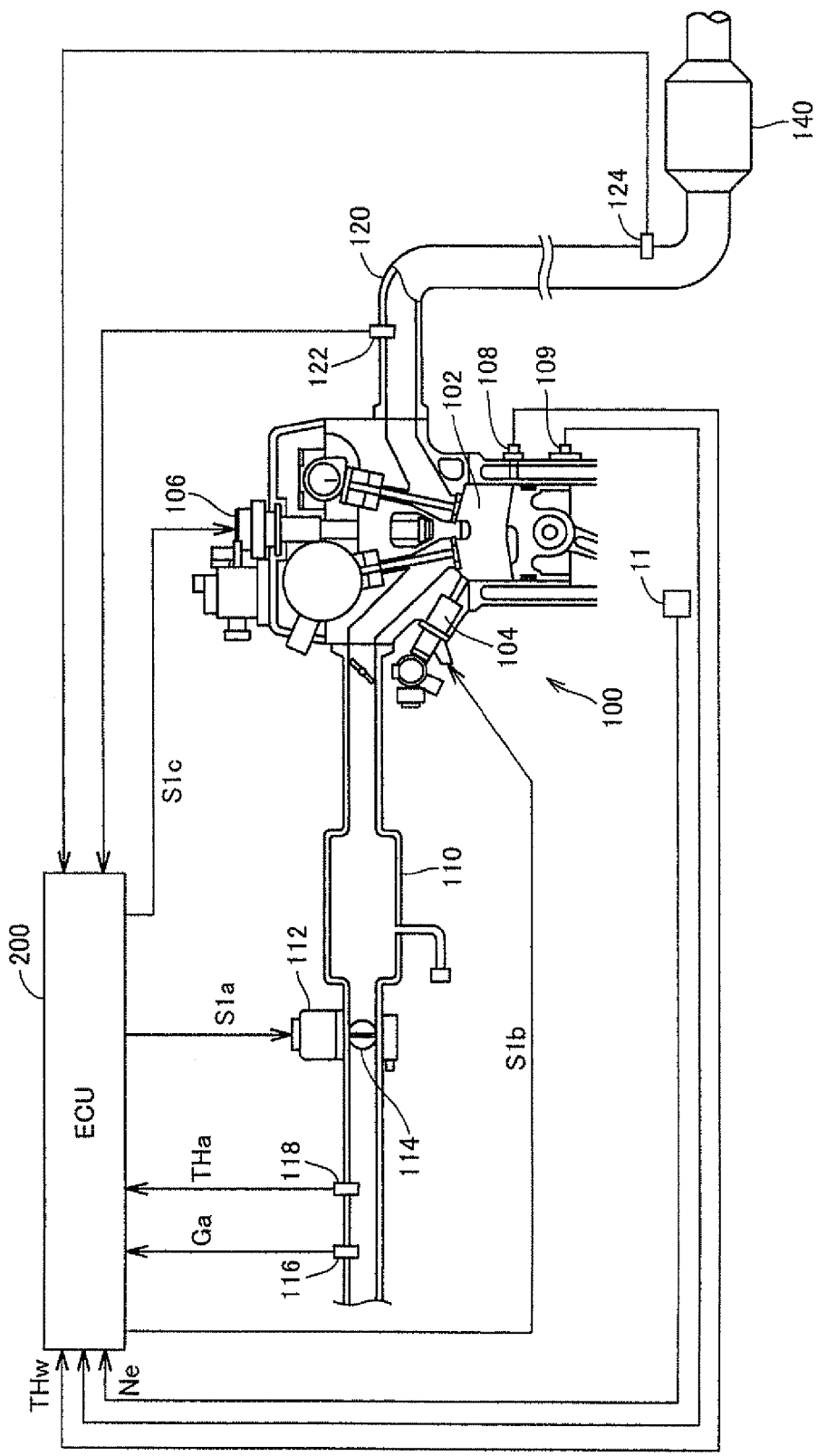
FIG. 2 is a diagram showing details of an engine.

FIG. 2 is a diagram showing details of engine 100. It is noted that although FIG. 2 shows one cylinder, a plurality of cylinders are provided at engine 100 in practice.

In engine 100, the air taken in from an air cleaner (not shown) flows through an intake pipe 110 to be introduced into a combustion chamber 102 of engine 100.

A throttle valve 114 is controlled by control signal S1$a$ from ECU 200 and regulates an amount of the air introduced into combustion chamber 102. An injector 104 is controlled by control signal S1$b$ from ECU 200 and injects fuel stored in a fuel tank (not shown) into combustion chamber 102. It is noted that the fuel may be injected from injector 104 into an intake manifold.

An ignition coil 106 is controlled by control signal S1$c$ from ECU 200 and ignites an air-fuel mixture in combustion chamber 102 to cause the air-fuel mixture to combust. The exhaust after the combustion at each cylinder is gathered at an exhaust manifold (not shown), and subsequently sent to an exhaust pipe 120 and purified with a catalyst 140 before emitted into the atmosphere.

Signals are input into ECU 200 from a rotation speed sensor 11, a water temperature sensor 108, a vibration sensor 109, an air flow meter 116, an intake air temperature sensor 118, an air-fuel ratio sensor 122, and an oxygen sensor 124.

Rotation speed sensor 11 detects engine rotation speed (the rotation speed of a crankshaft of engine 100) Ne. Water temperature sensor 108 detects engine water temperature THw. Vibration sensor 109 detects a vibration of a cylinder block engine 100. Air flow meter 116 detects an amount of intake air (an amount of the air taken into engine 100 per unit time) Ga. Intake air temperature sensor 118 detects intake air temperature THa. Air-fuel ratio sensor 122 detects an air-fuel ratio A/F in the exhaust flowing through exhaust pipe 120 (the ratio of air mass to fuel mass). Oxygen sensor 124 detects the oxygen concentration in the exhaust. Each of these sensors sends a signal representing a detection result to ECU 200.

Based on, for example, the detection results of these sensors, ECU 200 performs ignition control and fuel control over each cylinder. For instance, ECU 200 performs ignition in each cylinder in a predetermined order. In addition, ECU 200 performs control which brings a mean value of air-fuel ratio A/F close to a target air-fuel ratio (hereinafter referred to as "air-fuel ratio feedback control").

Returning back to FIG. 1, first MG 20 and second MG 30 are AC motors, such as three-phase AC synchronous motors.

Motive power split device 40 is formed of a planetary gear including a sun gear, pinion gears, a carrier, and a ring gear. The pinion gears are engaged with the sun gear and the ring gear. The carrier supports the pinion gears in a manner to allow rotation of the pinion gears, and is coupled to the crankshaft of engine 100. The sun gear is coupled to a rotation shaft of first MG 20. The ring gear is coupled to a rotation shaft of second MG 30 and speed reducer 50. Since engine 100, first MG 20, and second MG 30 are thus coupled together via motive power split device 40 formed of the planetary gear, engine rotation speed Ne, first MG rotation speed (the rotation speed of the rotation shaft of first MG 20) Nm1, and second MG rotation speed (the rotation speed of the rotation shaft of second MG 30) Nm2 are in such a relation that they are connected by a straight line in a nomographic chart, as shown in FIGS. 3-6 which will be described later.

PCU 60 converts DC power stored in battery 70 into AC power capable of driving first MG 20 and second MG 30 and outputs the converted power to first MG 20 and/or second MG 30. First MG 20 and/or second MG 30 are thereby driven by the power stored in battery 70. In addition, PCU 60 converts AC power generated by first MG 20 and/or second MG 30 into DC power capable of charging battery 70 and outputs the converted power to battery 70. Battery 70 is thereby charged by the power generated by first MG 20 and/or second MG 30.

Battery 70 is a DC power supply storing electric power for driving first MG 20 and/or second MG 30, and is formed of, for example, a secondary battery, such as a nickel-metal hydride secondary battery and a lithium ion secondary battery. Battery 70 has a voltage on the order of 200 V, for example. It is noted that as battery 70, a large-capacitance capacitor may be employed.

In addition, other than the above-described sensors (such as rotation speed sensor 11) detecting the state of engine 100, resolvers 12, 13, a vehicle speed sensor 14, an accelerator position sensor 15, and the like are connected to ECU 200.

Resolver 12 detects first MG rotation speed Nm1. Resolver 13 detects second MG rotation speed Nm2. Vehicle speed sensor 14 detects vehicle speed V from the rotation speed of a drive shaft. Accelerator position sensor 15 detects an amount of operation A of an accelerator pedal by a user. Each of these sensors sends a signal representing a detection result to ECU 200.

Further, an information panel 16 placed on an upper portion of an instrument panel of vehicle 1 is connected to ECU 200. Information panel 16 is controlled by a control signal S3 from ECU 200 and displays warning information and the like for a driver.

ECU 200 includes a built-in CPU (Central Processing Unit) and a built-in memory, both not shown in the drawing, and is configured to execute predetermined arithmetic processing based on information stored in the memory and information from each sensor.

ECU 200 controls engine 100, first MG 20, and second MG 30 responsive to the state of vehicle 1. It is noted that the torque of engine 100 is hereinafter referred to as "engine torque Te", the torque of first MG 20 as "first MG torque Tm1", and the torque of second MG 30 as "second MG torque Tm2".

FIGS. 3-6 all show the states of engine 100, first MG 20, and second MG 30, which are controlled by ECU 200, on a nomographic chart. It is noted that as described above, engine rotation speed Ne, first MG rotation speed Nm1, and second MG rotation speed Nm2 are in such a relation that they are connected by a straight line in the nomographic charts.

Figure 3:
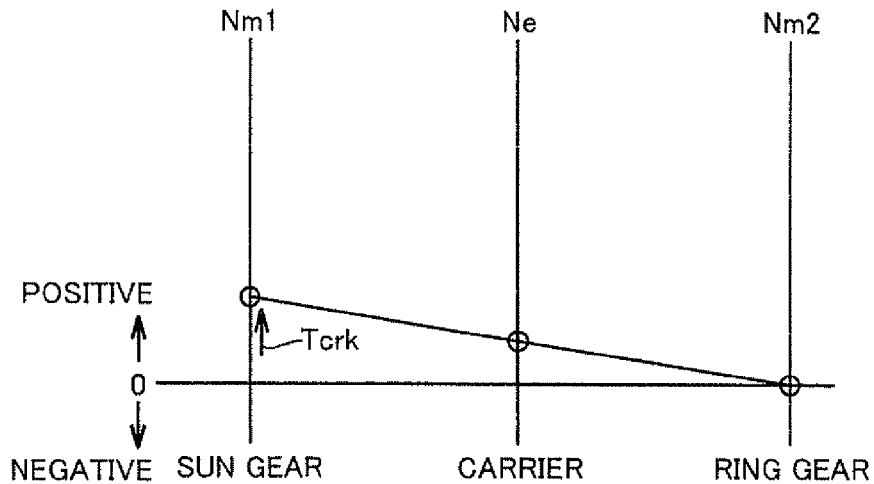
FIG. 3 shows a nomographic chart on start-up of the engine.

FIG. 3 shows a nomographic chart on start-up of engine 100. It is noted that FIG. 3 illustrates a case where engine 100 is started up while the vehicle is stopped (when Nm2=0).

In starting up engine 100, ECU 200 first uses first MG 20 to crank engine 100. That is, ECU 200 causes first MG 20 to generate cranking torque Tcrk, as shown in FIG. 3 (it is assumed that Tm1=Tcrk). Once cranking torque Tcrk has increased engine rotation speed Ne to a predetermined speed, ECU 200 performs ignition with ignition coil 106. When the ignition causes combustion of an air-fuel mixture (what is called first cycle), engine 100 is started up, and torque generated by engine 100 itself increases engine rotation speed Ne further.

Figure 4:
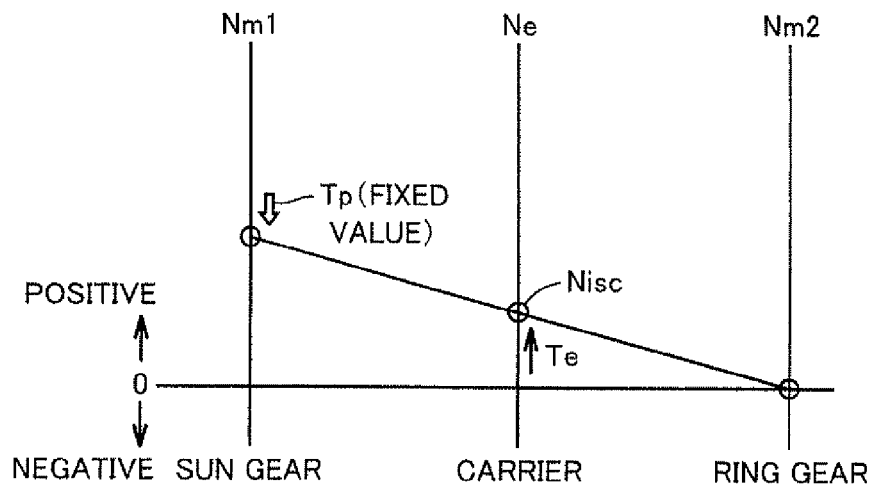
FIG. 4 shows a nomographic chart during a stop at idle.

FIG. 4 shows a nomographic chart during a stop at idle (when engine 100 is controlled to be in an idle state while the vehicle is stopped). During a stop at idle, ECU 200 carries out control that exerts feedback control over engine torque Te (more specifically, an amount of operation of throttle valve 114) such that engine rotation speed Ne is brought close to target idle rotation speed Nisc (this control is hereinafter referred to as "ISC control" (ISC: Idle Speed Control)).

At this time, since there is a backlash (play) between gears making up motive power split device 40, when first MG 20 is brought into a free state (a state of generating no torque), the gears making up motive power split device 40 irregularly abut against each other, and vibrations with relatively low frequencies (hereinafter also referred to as "idle vibrations") are generated. An abnormal sound caused by such idle vibrations may give a user a relatively great uncomfortable feeling while the vehicle is stopped, where no traveling noise is generated.

To suppress the idle vibrations, ECU 200 causes first MG 20 to generate torque for pressing the gears making up motive power split device 40 against each other to keep them abutting (hereinafter referred to as "pressing torque Tp"), as shown in FIG. 4 (it is assumed that Tm1=Tp). Pressing torque Tp has a magnitude which was so determined in advance through an experiment or the like as to be capable of suppressing the idle vibrations. Therefore, pressing torque Tp has a magnitude fixed at a constant value regardless of engine torque Te and engine rotation speed Ne. Pressing torque Tp is in a direction hindering engine 100 from operating (the negative direction shown in FIG. 4). The control that causes first MG 20 to generate pressing torque Tp is hereinafter referred to as "pressing control". It is noted that while the pressing control is being carried out, in view of the fact that pressing torque Tp hinders engine 100 from operating, an amount of intake air is increased by an amount corresponding to pressing torque Tp.

Figure 5:
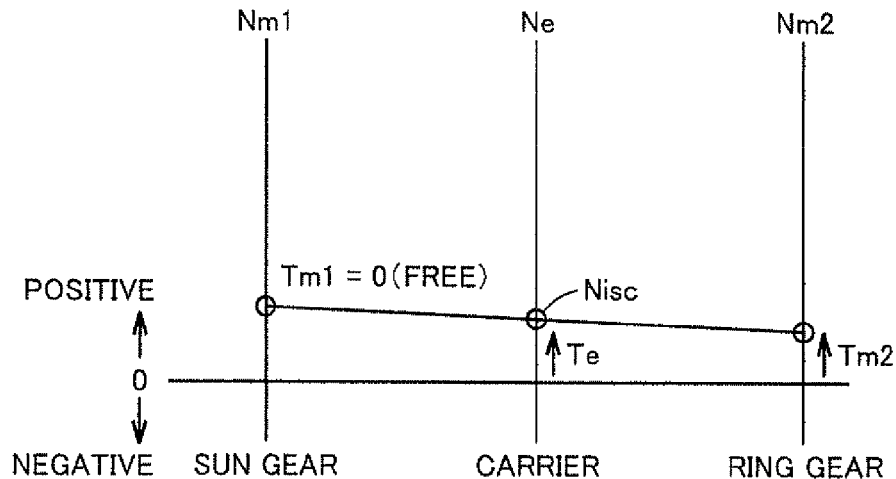
FIG. 5 shows a nomographic chart during traveling at idle.

FIG. 5 shows a nomographic chart during traveling at idle (a case where engine 100 is controlled to be in an idle state while the vehicle is traveling). ECU 200 carries out the above-described ISC control during traveling at idle as well. Thus, the idle vibrations could be generated in the same manner as while the vehicle is stopped; however, the idle vibrations give the user a relatively small uncomfortable feeling while the vehicle is traveling because the traveling noise and the like are also generated. For this reason, during traveling at idle, ECU 200 does not perform the pressing control and brings first MG 20 into a free state, as shown in FIG. 5 (it is assumed that Tm1=0). It is noted that the pressing control may also be performed during traveling at idle.

Figure 6:
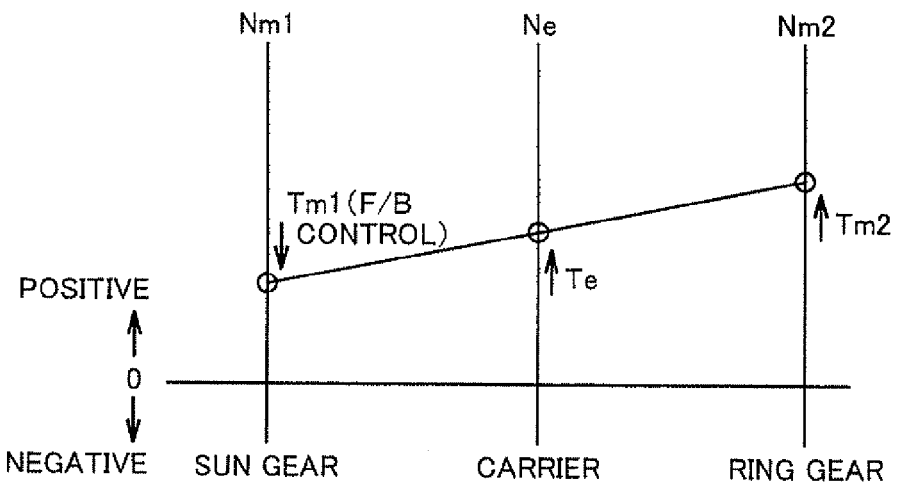
FIG. 6 shows a nomographic chart during a load operation.

FIG. 6 shows a nomographic chart during a load operation (a case where engine 100 is controlled to be in a load operation state which has a greater output than an idle state. ECU 200 controls engine torque Te and second MG torque Tm2 such that the torque requested by a user is satisfied during a load operation. In doing so, ECU 200 exerts feedback control over first MG torque Tm1 such that first MG torque Tm1 is in charge of the reaction force for engine torque Te and second MG torque Tm2. Therefore, first MG torque Tm1 is variably controlled responsive to engine torque Te and second MG torque Tm2 during a load operation, As above, in the present embodiment, engine 100, first MG 20, and second MG 30 are controlled responsive to the state of vehicle 1. In particular, during a stop at idle, the pressing control is carried out causing first MG 20 to generate pressing torque Tp, and therefore, the idle vibrations are suppressed. In this way, while the pressing control is being carried out, pressing torque Tp is applied in a direction hindering engine 100 from operating, which results in the suppression of rotational fluctuations of the engine (fluctuations in engine rotation speed Ne). Further, while the pressing control is being carried out, an amount of intake air is increased by an amount corresponding to pressing torque Tp, which results in stabilized combustion of an air-fuel mixture and a tendency toward further suppression of rotational fluctuations of the engine.

ECU 200, meanwhile, performs various determination processes that are based on rotational fluctuations of the engine (for example, imbalance determination which will be described later). For this reason, those processes can have decreased determination accuracy when the pressing control suppresses the rotational fluctuations of the engine.

Thus, ECU 200 controls a determination process which is based on rotational fluctuations of the engine and the above-described pressing control, correlating them with each other in a manner to avoid simultaneously carrying out the determination process and the pressing control. This is the most characteristic feature of the present invention.

It is noted that a representative example of the determination processes based on rotational fluctuations of the engine includes: "imbalance determination" determining whether or not an air-fuel ratio imbalance (hereinafter referred to as "imbalance abnormality"), where an imbalance arises between respective combustion states of cylinders of engine 100, has occurred; and "misfire determination" determining whether or not a misfire has occurred at any of the cylinders of engine 100. The "imbalance determination" will be hereinafter described as an illustrative example of a determination process based on rotational fluctuations of the engine.

Figure 7:
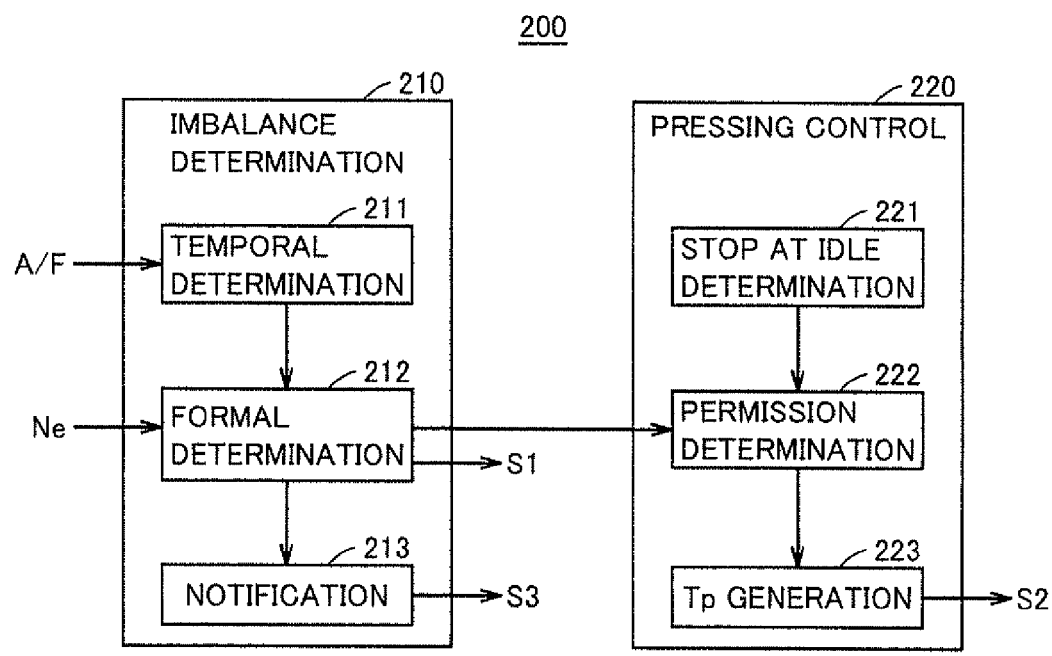
FIG. 7 is a functional block diagram of an ECU (No. 1).

FIG. 7 is a functional block diagram of part of ECU 200 relating to the imbalance determination and the pressing control. Each functional block shown in FIG. 7 may be realized by hardware or may be realized by software.

ECU 200 includes an imbalance determination unit 210 and a pressing control unit 220.

First, the functions of imbalance determination unit 210 will be described. Imbalance determination unit 210 includes a temporarily determining unit 211, a formally determining unit 212, and a notifying unit 213.

Temporarily determining unit 211 performs a process of temporarily determining whether or not the imbalance abnormality has occurred, based on air-fuel ratio A/F detected by air-fuel ratio sensor 122 (hereinafter also referred to as "temporary determination process"). For instance, when the combustion state at one cylinder is in a lean state, air-fuel ratio A/F is temporarily greater than a target air-fuel ratio. This cause the air-fuel ratio feedback control to control air-fuel ratio A/F at other cylinders such that air-fuel ratio A/F is smaller than the target air-fuel ratio (that is, in a rich state). As a result, air-fuel ratio A/F has a wider fluctuation range than usual. When such a state in which air-fuel ratio A/F has a wider fluctuation range than usual occurs, ECU 200 temporarily determines that the imbalance abnormality has occurred. It is noted that the temporary determination process is not limited to this manner.

When it is temporarily determined in the temporary determination process that the imbalance abnormality is present, formally determining unit 212 carries out the ISC control so that engine 100 is controlled to be in an idle state, and performs a process formally determining whether or not an imbalance abnormality has occurred based on fluctuations in engine rotation speed Ne at the time of the ISC control being carried out (hereinafter also referred to as "formal determination process"). The formal determination process is a process for verifying the reliability of a result of the determination made through the temporary determination process. For instance, as described above, when the combustion state at one cylinder is in a lean state, the air-fuel ratio feedback control controls the combustion state at other cylinders such that the combustion state is in a rich state. Responsive to fluctuations between the combustion states of the cylinders, engine rotation speed Ne during the ISC control also fluctuates. When such fluctuations in engine rotation speed Ne responsive to fluctuations between the combustion states of the cylinders occur, ECU 200 formally determines that the imbalance abnormality has occurred.

In addition, while carrying out the formal determination process, formally determining unit 212 outputs a signal indicating that the formal determination process is being carried out, to a permission determining unit 222 (described later) of pressing control unit 220. In addition, formally determining unit 212 outputs the result of the formal determination process to notifying unit 213.

When formally determining unit 212 formally determines that the imbalance abnormality is present, notifying unit 213 causes information panel 16 to display a warning to the effect that the imbalance abnormality has occurred, so as to notify a user to the effect that the imbalance abnormality has occurred. It is noted that the notification may be made to the user by audio or the like.

Next, the functions of pressing control unit 220 will be described. Pressing control unit 220 includes an idle determining unit 221, permission determining unit 222, and a torque generating unit 223.

Idle determining unit 221 determines whether or not it is during a stop at idle (whether or not engine 100 is controlled to be in an idle state while the vehicle is stopped).

If it is during a stop at idle, permission determining unit 222 determines, based on a signal from formally determining unit 212, whether or not the formal determination process of the imbalance determination (a determination process based on fluctuations in engine rotation speed Ne) is ongoing. Permission determining unit 222 permits carrying out the pressing control when the formal determination process is not ongoing, and prohibits, rather than permits, carrying out the pressing control when the formal determination process is ongoing. Permission determining unit 222 outputs a determination result of whether or not to permit carrying out the pressing control, to torque generating unit 223.

When permission determining unit 222 permits carrying out the pressing control, torque generating unit 223 generates a control signal S2 causing MG 20 to generate pressing torque Tp and outputs the generated signal to PCU 60. This causes the pressing control to be carried out. On the other hand, when permission determining unit 222 prohibits, rather than permits, carrying out the pressing control, torque generating unit 223 does not carry out the pressing control and does not cause first MG 20 to generate pressing torque Tp.

Figure 8:
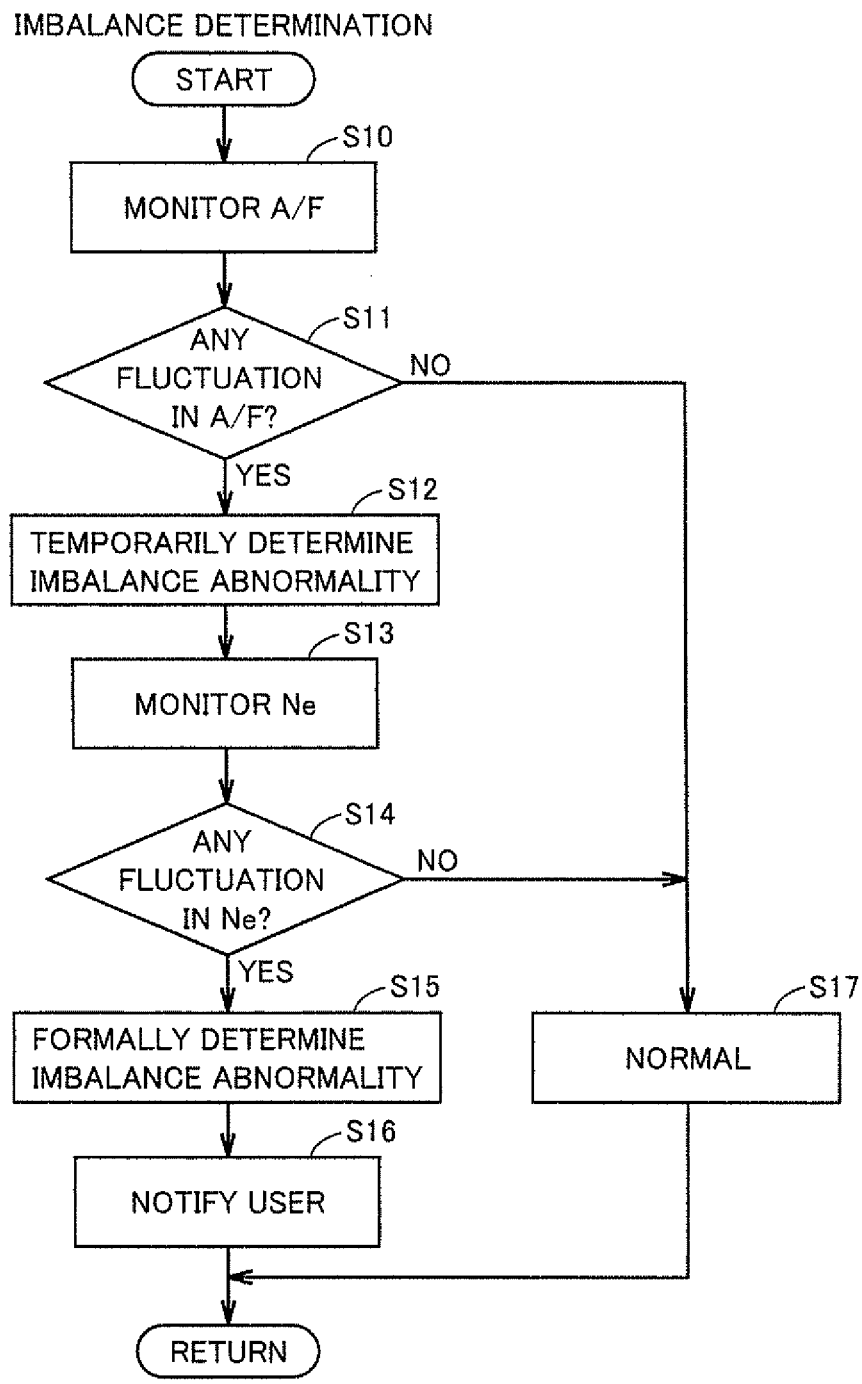
FIG. 8 is a flowchart showing process steps of the ECU (No. 1).

FIG. 8 is a flowchart showing process steps of ECU 200 for realizing the above-described functions of imbalance determination unit 210. This flowchart is repeatedly executed at a predetermined cycle during the operation of engine 100.

In S10, ECU 200 starts the temporary determination process of the imbalance abnormality. That is, ECU 200 monitors air-fuel ratio A/F. In S11, ECU 200 determines whether or not a fluctuation in air-fuel ratio A/F is present. This determination is made depending on, for example, whether or not air-fuel ratio A/F has a fluctuation range which is above a predetermined threshold value (a value corresponding a usual value), as described above. The determination may be made depending on, for example, whether or not air-fuel ratio A/F has a fluctuation wave form which approximately matches a fluctuation wave form at the time of occurrence of the imbalance abnormality, which was obtained in advance through an experiment or the like.

If air-fuel ratio A/F is fluctuating (YES in S11), ECU 200 shifts the process to S12 and temporarily determines that the imbalance abnormality is present. Subsequently, ECU 200 starts the formal determination process of the imbalance abnormality. That is, in S13, ECU 200 carries out the ISC control so that control engine 100 is controlled to be in an idle state, and monitors engine rotation speed Ne when at idle. In S14, ECU 200 then determines whether or not any fluctuation in engine rotation speed Ne is present. This determination is made depending on, for example, whether or not engine rotation speed Ne has a fluctuation range which is above a predetermined threshold value (a value corresponding to a usual value), as described above.

If engine rotation speed Ne is fluctuating (YES in S14), ECU 200 formally determines in S15 that the imbalance abnormality has occurred, and notifies a user of the occurrence of the imbalance abnormality in S16.

In contrast, if air-fuel ratio A/F is not fluctuating (NO in S11), or if air-fuel ratio A/F is fluctuating but engine rotation speed Ne is not fluctuating (NO in S14), ECU 200 shifts the process to S17 and determines that the state is normal (a state in which no imbalance abnormality has occurred).

Figure 9:
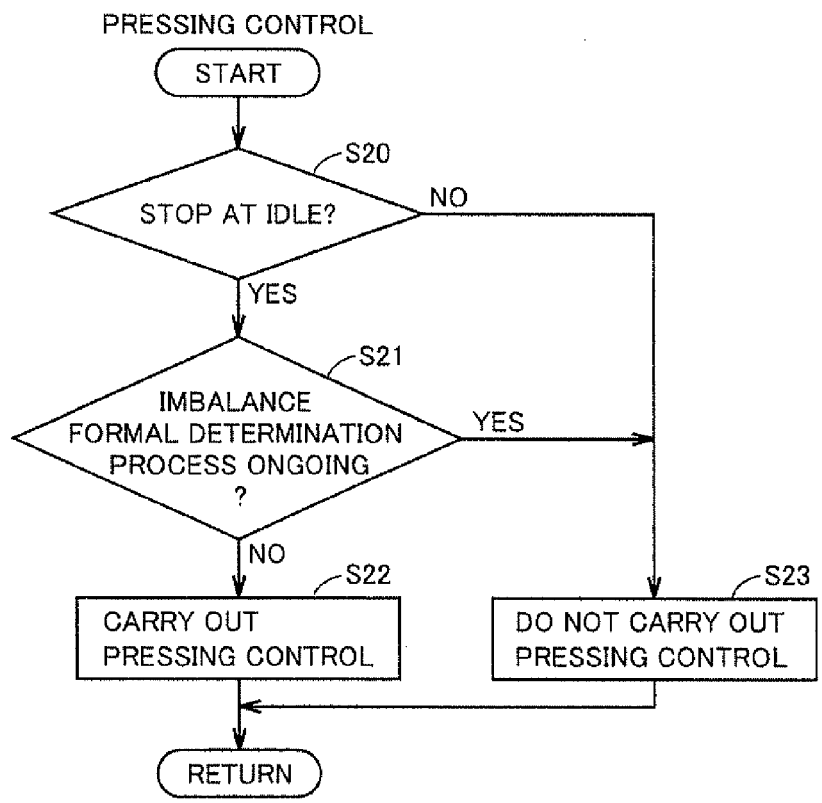
FIG. 9 is a flowchart showing process steps of the ECU (No. 2).

FIG. 9 is a flowchart showing process steps of ECU 200 for realizing the above-described functions of pressing control unit 220. This flowchart is repeatedly executed at a predetermined cycle during the operation of engine 100.

In S20, ECU 200 determines whether or not it is during a stop at idle. If it is during a stop at idle (YES in S20), ECU 200 determines in S21 whether or not the formal determination process of the imbalance abnormality (the process of S13-S15 in FIG. 8) is ongoing. If the formal determination process is not ongoing (NO in S21), ECU 200 carries out the pressing control in S22.

In contrast, if it is not during a stop at idle (NO in S20), or even though it is during a stop at idle, if the formal determination process of the imbalance abnormality is ongoing (YES in S21), ECU 200 does not carry out the pressing control in S23.

As above, ECU 200 according to the present embodiment determines whether or not the formal determination process of the imbalance abnormality (a determination process based on rotational fluctuations of the engine) is ongoing during a stop at idle, and when the formal determination process is ongoing, ECU 200 does not carry out the pressing control. It can thereby be avoided that the pressing control suppresses rotational fluctuations of the engine in the middle of determining the imbalance abnormality based on the rotational fluctuations of the engine. For this reason, an improved determination accuracy of imbalance abnormality is achieved. On the other hand, when the formal determination process is not ongoing during a stop at idle, ECU 200 carries out the pressing control. An abnormal sound caused by the idle vibrations can thereby be suppressed. As a result, the suppression of an abnormal sound caused by the idle vibrations and an improved determination accuracy of imbalance abnormality can be achieved with a good balance therebetween.

Second Embodiment

The above-described first embodiment has explained an example in which the pressing control is not carried out during the formal determination process of the imbalance abnormality (during a determination process based on rotational fluctuations of the engine). In contrast, the present embodiment will explain an example where a user is not notified of a result of the formal determination process when the pressing control was being carried out during the formal determination process. It is noted that other structures, functions, and processes are the same as those in the above-described first embodiment, and therefore, a detailed description thereof is not be repeated here.

Figure 10:
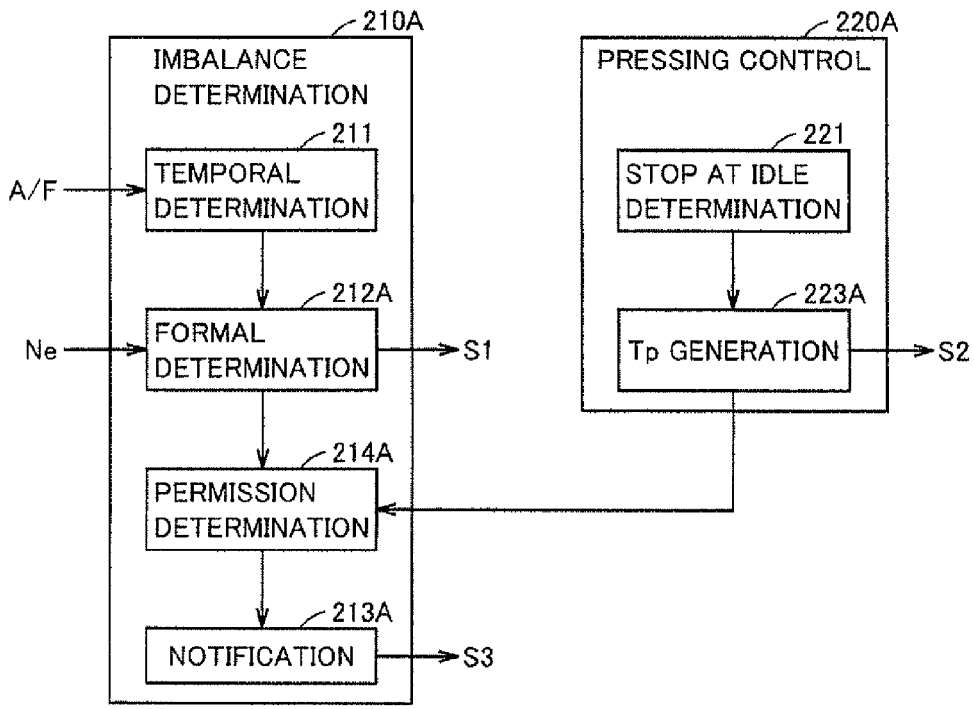
FIG. 10 is a functional block diagram of an ECU (No. 2).

FIG. 10 is a functional block diagram of an ECU 200A according to the present embodiment. It is noted that among the functional blocks shown in FIG. 10, the functional blocks having the same reference signs allotted as the functional blocks shown in FIG. 7 described before have already been described, and therefore, a detailed description thereof is not repeated here.

ECU 200A includes an imbalance determination unit 210A and a pressing control unit 220A.

First, the functions of pressing control unit 220A will be described. Pressing control unit 220A includes idle determining unit 221 and a torque generating unit 223A. When idle determining unit 221 determines that it is during a stop at idle, torque generating unit 223A causes MG 20 to generate pressing torque Tp to carry out the pressing control. In addition, while carrying out the pressing control, torque generating unit 223A outputs a signal indicating that the pressing control is being carried out, to a permission determining unit 214A (described later) of imbalance determination unit 210A.

Next, the functions of imbalance determination unit 210A will be described. Imbalance determination unit 210A includes temporarily determining unit 211, a formally determining unit 212A, permission determining unit 214A, and a notifying unit 213A.

When temporarily determining unit 211 temporarily determines that the imbalance abnormality is present, formally determining unit 212A performs the formal determination process. Formally determining unit 212A outputs a result of the formal determination process to permission determining unit 214A.

When formally determining unit 212A formally determines that the imbalance abnormality is present, permission determining unit 214A determines whether or not the pressing control was being carried out during the formal determination process. permission determining unit 214A permits notifying a user of the result of the formal determination process when the pressing control was not being carried out during the formal determination process, and prohibits, rather than permits, notifying the user of the result of the formal determination process when the pressing control was being carried out during the formal determination process.

When permission determining unit 214A permits providing the user with a notification, notifying unit 213A notifies the user of the occurrence of the imbalance abnormality. On the other hand, when permission determining unit 214A prohibits, rather than permits, a notification to the user, notifying unit 213A does not notify the user of the occurrence of the imbalance abnormality.

Figure 11:
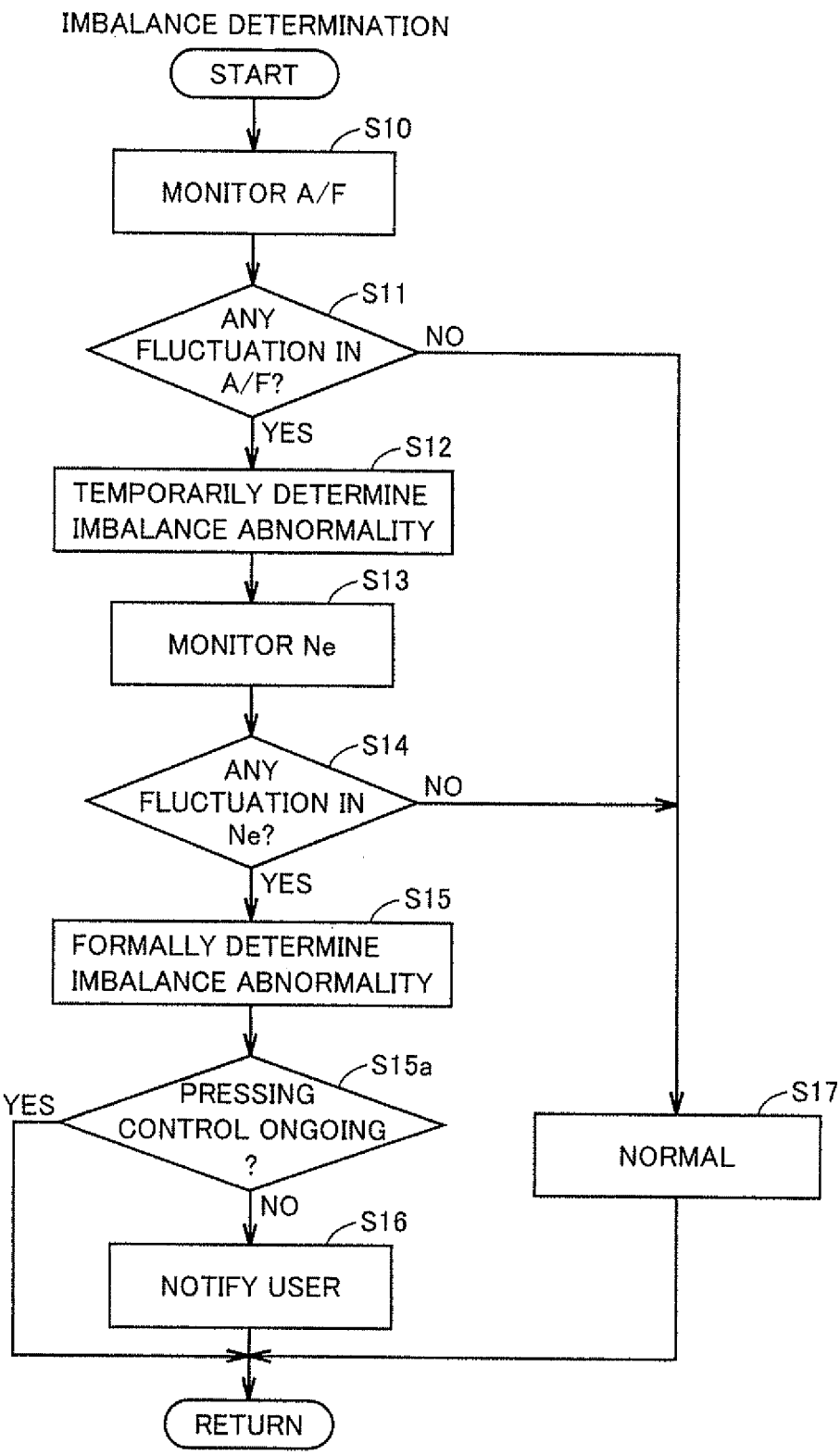
FIG. 11 is a flowchart showing process steps of the ECU (No. 3).

FIG. 11 is a flowchart showing process steps of ECU 200A for realizing the above-described functions of imbalance determination unit 210A. It is noted that among the steps shown in FIG. 11, the steps having the same numbers allotted as the steps shown in FIG. 8 described before have already been described, and therefore, a detailed description thereof is not repeated here.

After it is formally determined in S15 that the imbalance abnormality has occurred, ECU 200A determines in S15a whether or not the pressing control is ongoing.

If the pressing control is not ongoing (NO in S15), in S16, ECU 200A notifies a user of the occurrence of the imbalance abnormality. On the other hand, if the pressing control is ongoing (YES in S15), ECU 200A terminates the process without notifying the user of the occurrence of the imbalance abnormality.

Figure 12:
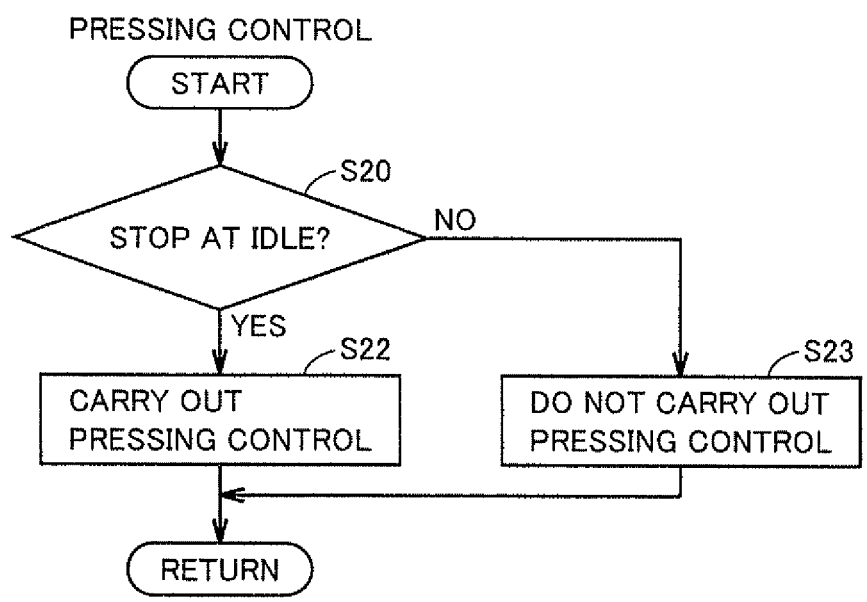
FIG. 12 is a flowchart showing process steps of the ECU (No. 4).

FIG. 12 is a flowchart showing process steps of ECU 200A for realizing the above-described functions of pressing control unit 220A. It is noted that among the steps shown in FIG. 12, the steps having the same numbers allotted as the steps shown in FIG. 9 have already been described, and therefore, a detailed description thereof will not be repeated.

If it is during a stop at idle (YES in S20), ECU 200 carries out the pressing control in S22. If it is not during a stop at idle (NO in S20), ECU 200 does not carry out the pressing control in S23.

As above, ECU 200A according to the present embodiment does not notify a user of a result of the formal determination process when the pressing control was being carried out during the formal determination process of the imbalance abnormality (during a determination process based on the rotational fluctuations of the engine). For this reason, it is possible to avoid notifying the user of the imbalance abnormality which was determined based on rotational fluctuations of the engine which had been suppressed by the pressing control (a determination result with low accuracy), while suppressing an abnormal sound caused by the idle vibrations through the pressing control.

Third Embodiment

The above-described second embodiment has explained an example in which a user is not notified of a result of the formal determination process when the pressing control was being carried out during the formal determination process. In contrast, the present embodiment will explain an example in which a shift to the formal determination process is not made when the pressing control is being carried out even when it is temporarily determined that the imbalance abnormality is present. It is noted that other structures, functions, and processes are the same as those in the above-described first embodiment, and therefore, a detailed description thereof is not be repeated here.

Figure 13:
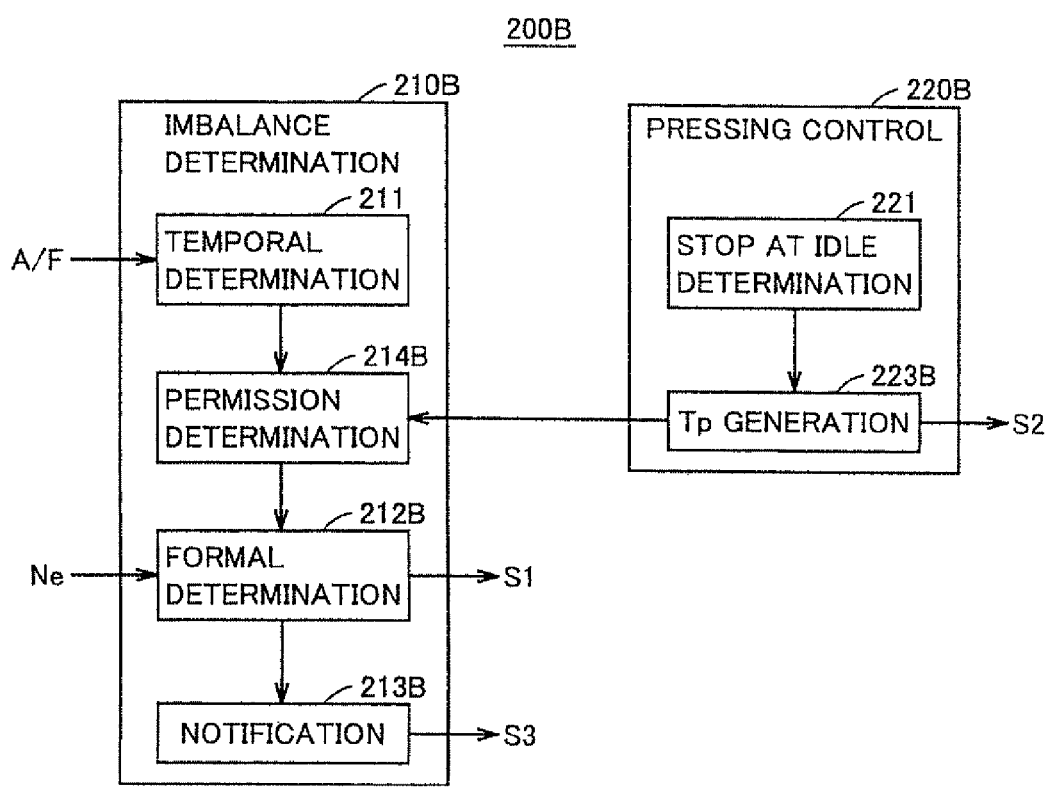
FIG. 13 is a functional block diagram of an ECU (No. 3).

FIG. 13 is a functional block diagram of ECU 200B according to the present embodiment. It is noted that among the functional blocks shown in FIG. 13, the functional blocks having the same reference signs allotted as the functional blocks shown in FIG. 7 described before have already been described, and therefore, a detailed description thereof is not repeated here.

ECU 200B includes an imbalance determination unit 210B and a pressing control unit 220B.

First, the functions of pressing control unit 220B will be described. Pressing control unit 220B includes idle determining unit 221 and a torque generating unit 223B. When idle determining unit 221 determines that it is during a stop at idle, torque generating unit 223B causes MG 20 to generate pressing torque Tp to carry out the pressing control. In addition, while carrying out carrying out the pressing control, torque generating unit 223B outputs a signal indicating that the pressing control is being carried out, to a permission determining unit 214B (described later) of imbalance determination unit 210B. It is noted that the process steps for realizing the functions of pressing control unit 220B are the same as those in FIG. 12 described above.

Next, the functions of imbalance determination unit 210B will be described. Imbalance determination unit 210B includes temporarily determining unit 211, permission determining unit 214B, a formally determining unit 212B, and a notifying unit 213B.

When temporarily determining unit 211 determines that the imbalance abnormality is present, permission determining unit 214B determines whether or not the pressing control is being carried out. When the pressing control is not being carried out, permission determining unit 214B permits carrying out the formal determination process. When the pressing control is being carried out, permission determining unit 214B prohibits, rather than permits, carrying out the formal determination process. Permission determining unit 214B outputs a determination result to formally determining unit 212B.

Formally determining unit 212B carries out the formal determination process when permission determining unit 214B permits carrying out the formal determination process, and when not, does not carry out the formal determination process. Formally determining unit 212B outputs a result of the formal determination process to notifying unit 213B.

When formally determining unit 212B formally determines that the imbalance abnormality is present, notifying unit 213B notifies a user of the occurrence of the imbalance abnormality.

Figure 14:
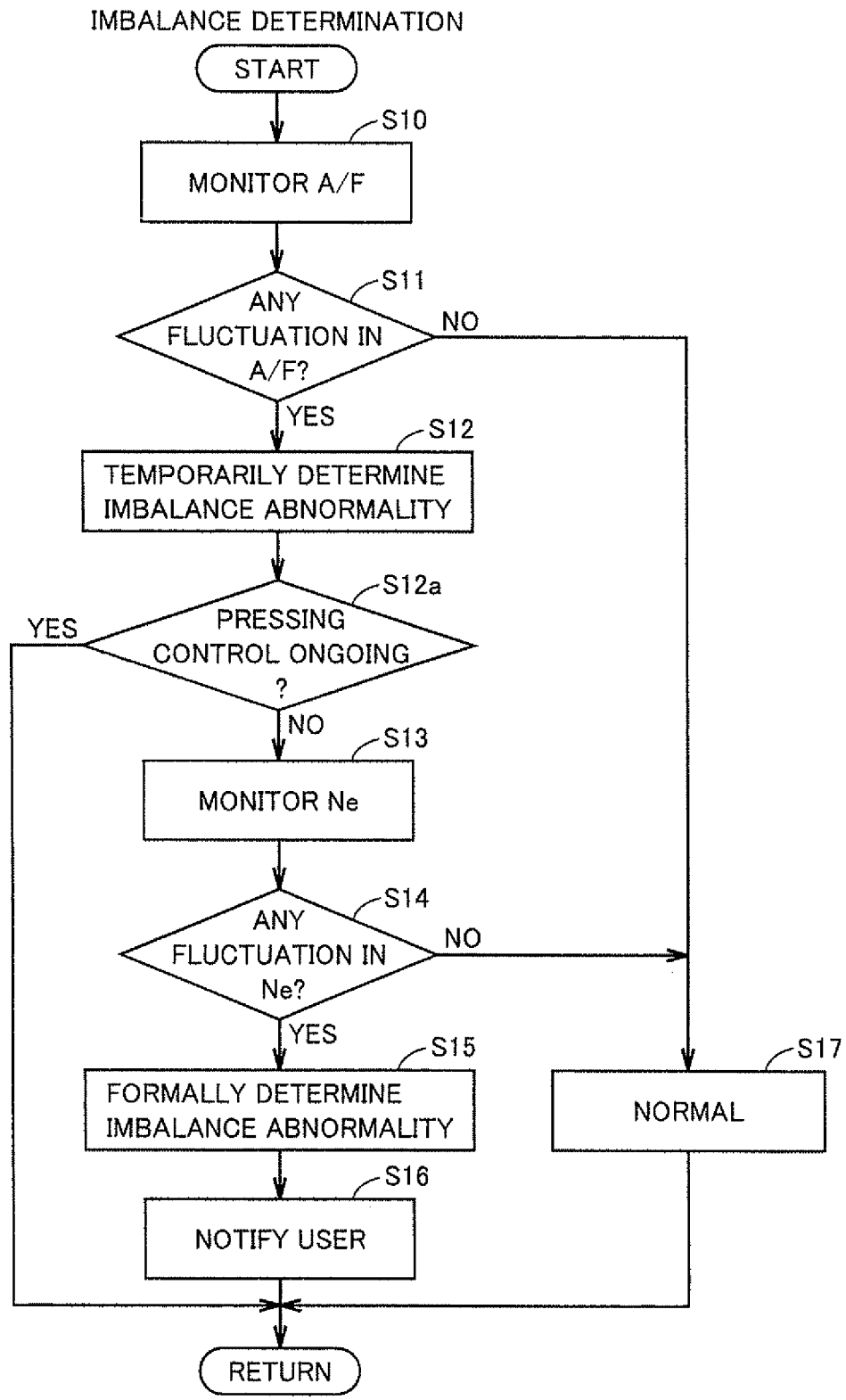
FIG. 14 is a flowchart showing process steps of the ECU (No. 5).

FIG. 14 is a flowchart showing process steps of ECU 200B for realizing the above-described functions of imbalance determination unit 210B. It is noted that among the steps shown in FIG. 14, the steps having the same numbers allotted as the steps shown in FIG. 8 described before have already been described, and therefore, a detailed description thereof is not repeated here.

After it is temporarily determined in S12 that the imbalance abnormality is present, ECU 200B determines in S12a whether or not the pressing control is ongoing.

If the pressing control is not ongoing (NO in S12), ECU 200B carries out the formal determination process of the imbalance abnormality through the process in S13 and subsequent steps. On the other hand, if the pressing control is ongoing (YES in S12), ECU 200B terminates the process without carrying out the formal determination process of the imbalance abnormality.

As above, ECU 200B according to the present embodiment does not carry out the formal determination process when the pressing control is being carried out even when it is temporarily determined that the imbalance abnormality is present. For this reason, it is possible to avoid determining the imbalance abnormality based on rotational fluctuations of the engine which have been suppressed by the pressing control, while suppressing an abnormal sound caused by the idle vibrations through the pressing control.

It should be understood that the embodiments disclosed herein are illustrative and non-restrictive in every respect. The scope of the present invention is defined by the terms of the claims rather than the above description, and is intended to include any modifications within the scope and meaning equivalent to the terms of the claims.

REFERENCE SIGNS LIST 1 vehicle; 11 rotation speed sensor; 12, 13 resolver; 14 vehicle speed sensor; 15 accelerator position sensor; 16 information panel; 20 first MG; 30 second MG; 40 motive power split device; 50 speed reducer; 60 PCU; 70 battery; 80 drive wheel; 100 engine; 102 combustion chamber; 104 injector; 106 ignition coil; 108 water temperature sensor; 109 vibration sensor; 110 intake pipe; 114 throttle valve; 116 air flow meter; 118 intake air temperature sensor; 120 exhaust pipe; 122 air-fuel ratio sensor; 124 oxygen sensor; 140 catalyst; 200 ECU; 210, 210A, 210B imbalance determination unit; 211 temporarily determining unit; 212, 212A, 212B formally determining unit; 213, 213A, 213B notifying unit; 214A, 214B, 222 permission determining unit; 220, 220A, 220B control unit; 221 idle determining unit; 223, 223A, 223B torque generating unit.

The invention claimed is:

1. A vehicle comprising:

an internal combustion engine having a plurality of cylinders;

a motor coupled to said internal combustion engine via a gear mechanism; and a control device carrying out a determination process controlling said internal combustion engine such that said internal combustion engine is in an idle state and determining, based on rotational fluctuations of said internal combustion engine at the time of said internal combustion engine being in an idle state, whether or not an imbalance abnormality where an imbalance arises between respective combustion states of said plurality of cylinders is present and a particular control causing said motor to generate suppressing torque acting in a direction hindering said internal combustion engine from operating for suppressing vibrations of said gear mechanism while said internal combustion engine is operating, said control device comprising:

a determination unit carrying out said determination process; and a control unit carrying out said particular control, said determination unit temporarily determining whether or not said imbalance abnormality is present based on an air-fuel ratio in exhaust of said internal combustion engine and, when it is temporarily determined that said imbalance abnormality is present, controlling said internal combustion engine such that said internal combustion engine is in an idle state and carrying out said determination process based on said rotational fluctuations at the time of said internal combustion engine being in an idle state, and when said internal combustion engine is in an idle state, said control unit carrying out said particular control when said determination process is not ongoing and not carrying out said particular control when said determination process is ongoing.

2. A vehicle comprising:

an internal combustion engine having a plurality of cylinders;

a motor coupled to said internal combustion engine via a gear mechanism; and a control device carrying out a determination process controlling said internal combustion engine such that said internal combustion engine is in an idle state and determining, based on rotational fluctuations of said internal combustion engine at the time of said internal combustion engine being in an idle state, whether or not an imbalance abnormality where an imbalance arises between respective combustion states of said plurality of cylinders is present and a particular control causing said motor to generate suppressing torque acting in a direction hindering said internal combustion engine from operating for suppressing vibrations of said gear mechanism while said internal combustion engine is operating, said control device comprising:

a determination unit carrying out said determination process; and a control unit carrying out said particular control, said control unit carrying out said particular control when said internal combustion engine is in an idle state, and said determination unit temporarily determining whether or not said imbalance abnormality is present based on an air-fuel ratio in exhaust of said internal combustion engine, when it is temporarily determined that said imbalance abnormality is present, controlling said internal combustion engine such that said internal combustion engine is in an idle state and carrying out said determination process based on said rotational fluctuations at the time of said internal combustion engine being in an idle state, notifying a user of a result of said determination process when said particular control was not being carried out while said determination process was being carried out, and not notifying a user of a result of said determination process when said particular control was being carried out while said determination process was being carried out.

3. A vehicle comprising:

an internal combustion engine having a plurality of cylinders;

a motor coupled to said internal combustion engine via a gear mechanism; and a control device carrying out a determination process controlling said internal combustion engine such that said internal combustion engine is in an idle state and determining, based on rotational fluctuations of said internal combustion engine at the time of said internal combustion engine being in an idle state, whether or not an imbalance abnormality where an imbalance arises between respective combustion states of said plurality of cylinders is present and a particular control causing said motor to generate suppressing torque acting in a direction hindering said internal combustion engine from operating for suppressing vibrations of said gear mechanism while said internal combustion engine is operating, said control device comprising:

a determination unit carrying out said determination process; and a control unit carrying out said particular control, said control unit carrying out said particular control when said internal combustion engine is in an idle state, and said determination unit temporarily determining whether or not said imbalance abnormality is present based on an air-fuel ratio in exhaust of said internal combustion engine and, when it is temporarily determined that said imbalance abnormality is present, controlling said internal combustion engine such that said internal combustion engine is in an idle state and carrying out said determination process based on said rotational fluctuations at the time of said internal combustion engine being in an idle state when said particular control is not ongoing and not carrying out said determination process when said particular control is ongoing.

4. A control method performed by a control device of a vehicle comprising an internal combustion engine having a plurality of cylinders and a motor coupled to said internal combustion engine via a gear mechanism, the control method comprising the steps of:
carrying out a determination process controlling said internal combustion engine such that said internal combustion engine is in an idle state and determining, based on rotational fluctuations of said internal combustion engine at the time of said internal combustion engine being in an idle state, whether or not an imbalance abnormality where an imbalance arises between respective combustion states of said plurality of cylinders is present; and
carrying out particular control causing said motor to generate suppressing torque acting in a direction hindering said internal combustion engine from operating for suppressing vibrations of said gear mechanism while said internal combustion engine is operating,
said step of carrying out said determination process temporarily determining whether or not said imbalance abnormality is present based on an air-fuel ratio in exhaust of said internal combustion engine and, when it is temporarily determined that said imbalance abnormality is present, controlling said internal combustion engine such that said internal combustion engine is in an idle state and carrying out said determination process based on said rotational fluctuations at the time of said internal combustion engine being in an idle state, and
when said internal combustion engine is in an idle state, said step of carrying out said particular control
carrying out said particular control when said determination process is not ongoing and
not carrying out said particular control when said determination process is ongoing.

5. A control method performed by a control device of a vehicle comprising an internal combustion engine having a plurality of cylinders and a motor coupled to said internal combustion engine via a gear mechanism, the control method comprising the steps of
carrying out a determination process controlling said internal combustion engine such that said internal combustion engine is in an idle state and determining, based on rotational fluctuations of said internal combustion engine at the time of said internal combustion engine being in an idle state, whether or not an imbalance abnormality where an imbalance arises between respective combustion states of said plurality of cylinders is present; and
carrying out particular control causing said motor to generate suppressing torque acting in a direction hindering said internal combustion engine from operating for suppressing vibrations of said gear mechanism while said internal combustion engine is operating,
said step of carrying out said particular control carrying out said particular control when said internal combustion engine is in an idle state, and
said step of carrying out said determining process temporarily determining whether or not said imbalance abnormality is present based on an air-fuel ratio in exhaust of said internal combustion engine, when it is temporarily determined that said imbalance abnormality is present, controlling said internal combustion engine such that said internal combustion engine is in an idle state and carrying out said determination process based on said rotational fluctuations at the time of said internal combustion engine being in an idle state, notifying a user of a result of said determination process when said particular control was not being carried out while said determination process was being carried out, and not notifying a user of a result of said determination process when said particular control was being carried out while said determination process was being carried out.

6. A control method performed by a control device of a vehicle comprising an internal combustion engine having a plurality of cylinders and a motor coupled to said internal combustion engine via a gear mechanism, the control method comprising the steps of:
carrying out a determination process controlling said internal combustion engine such that said internal combustion engine is in an idle state and determining, based on rotational fluctuations of said internal combustion engine at the time of said internal combustion engine being in an idle state, whether or not an imbalance abnormality where an imbalance arises between respective combustion states of said plurality of cylinders is present; and
carrying out particular control causing said motor to generate suppressing torque acting in a direction hindering said internal combustion engine from operating for suppressing vibrations of said gear mechanism while said internal combustion engine is operating,
said step of carrying out said particular control carrying out said particular control when said internal combustion engine is in an idle state, and
said step of carrying out said determining process temporarily determining whether or not said imbalance abnormality is present based on an air-fuel ratio in exhaust of said internal combustion engine and, when it is temporarily determined that said imbalance abnormality is present,
controlling said internal combustion engine such that said internal combustion engine is in an idle state and carrying out said determination process based on said rotational fluctuations at the time of said internal combustion engine being in an idle state when said particular control is not ongoing and
not carrying out said determination process when said particular control is ongoing.

* * * * *